Jan. 9, 1940.                    C. ROSSETTI                    2,186,929
              METHOD FOR MANUFACTURING A HIGHLY ACTIVE
                  DEPOLARIZER FROM NATURAL PYROLUSITE
                         Filed June 18, 1938
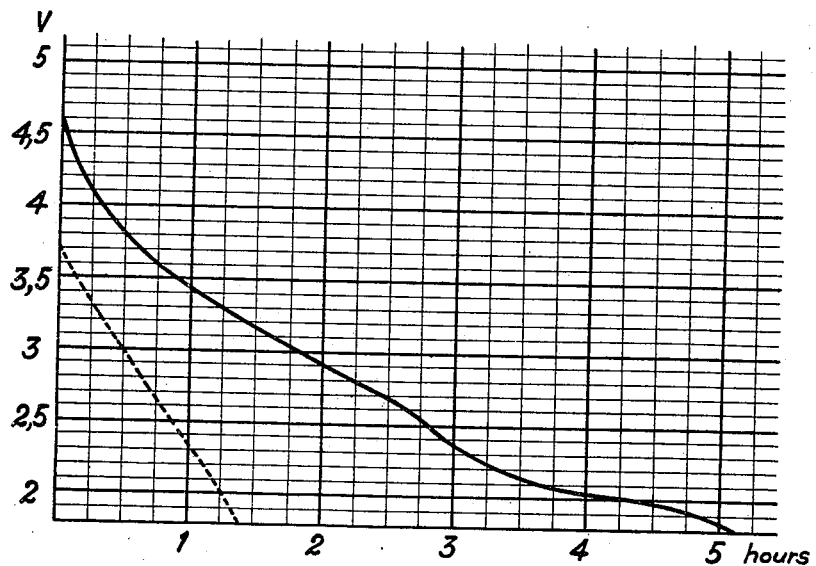
INVENTOR
CARLO ROSSETTI
By Young, Emery & Thompson
                    ATTYS.

Patented Jan. 9, 1940

2,186,929

UNITED STATES PATENT OFFICE 2,186,929

METHOD FOR MANUFACTURING A HIGHLY ACTIVE DEPOLARIZER FROM NATURAL PYROLUSITE

Carlo Rossetti, Yverdon, Switzerland, assignor to the firm Leclanché S. A., Yverdon, Switzerland, a joint-stock company of Switzerland Application June 18, 1938, Serial No. 214,596
In Germany June 23, 1937

1 Claim. (Cl. 23—145)

This invention relates to a method for manufacturing a highly active depolarizer from natural pyrolusite.

It is known that manganese dioxide is used as a depolarizer in Leclanché cells. Natural pyrolusite as well as artificial pyrolusite, manganic hydroxide or a mixture of both may be mixed for this purpose with graphite and used as a depolarizing material. It is known however, that pure natural pyrolusite possesses too weak and too slow a depolarizing capacity to suit the present needs of the industry. On the other hand the production costs of hydroxides obtained by precipitation from manganese solutions are very high.

The object of the present invention is to produce directly from natural pyrolusite an electrochemically highly active and cheap agent much better adapted as a depolarizing means than the natural pyrolusite hitherto used.

According to the present invention a method is provided of manufacturing a depolarizer of high depolarizing capacity by roasting pyrolusite and subsequent treatment with a mineral acid which is characterized in that the roasting is effected in the presence of carbon under such conditions of temperature and time that at least the main body of the manganese dioxide is reduced to a mixture of lower oxides and that said reduced mixture is suddenly cooled to obtain a large superficial area and treated with at least one acid to dissolve out the MnO, and that the depolarizing residue thus obtained is separated from the solution of manganous oxide containing impurities.

The lower oxides produced in the roasting step include $Mn_2O_3$ which may be considered as a mixed oxide consisting of $MnO_2$ and $MnO$. The MnO is dissolved during the acid treatment, forming a soluble manganese salt, whereby a mass remains principally consisting of $MnO_2$ possessing remarkable depolarizing qualities.

The treating with acid also has the advantage of freeing the natural pyrolusite from various deleterious impurities. Thus for instance metallic oxides such as copper oxides, the presence of which set disadvantageously upon cells of the Leclanché type, become dissolved and are removed.

Commercial natural pyrolusite usually contains more or less large quantities of silica and silicates. These substances, which are slow to react, decrease the depolarizing capacity of the natural pyrolusite because of their absolute inertia. The presence of hydrofluoric acid in the dissolving acid, which transforms the silica and the silicates into $SiF_4$ thus improves and enriches the depolarizer produced according to the present invention.

Since the depolarizing action is principally a surface reaction, the surface quality of the means produced according to the invention may be influenced excellently by chilling the hot roasted reaction mass in water.

Example

A commercial natural pyrolusite is roasted in the usual way in a furnace heated to 600 to 700° C. in the presence of carbon for such a length of time (about half an hour) that a reduction of the $MnO_2$ into a mixture of oxides takes place, corresponding preferably to the formula below $Mn_2O_3$. The reduced mass is then leached in a hydro-extractor by means of a 10% aqueous solution of sulphuric acid and exhausted with acidulated water until in the dry product about 5% of MnO is still present.

To the solution containing sulphuric acid hydrofluoric acid is preferably added, if the natural pyrolusite contains silicates.

The depolarizing agent thus obtained shows considerably improved depolarizing qualities, as compared with natural pyrolusite. It is characterized by its increased electromotive force (for instance 1.63 volts instead of 1.52 for a depolarizing mass consisting of 75% of natural pyrolusite and 25% of graphite).

As shown by the accompanying drawing also the duration of discharge is increased.

The drawing represents as examples two discharge curves each of a Leclanché cell made with natural pyrolusite. The full-line curve corresponds to a natural pyrolusite treated by the method according to the present invention, while the dotted-line curve relates to the nontreated product.

In both cases the natural pyrolusite was mixed with graphite in the ratio of 75% to $MnO_2$ to 25% of graphite.

The discharge voltage is represented by the ordinates and the time of discharge in hours by the abscissae.

The characteristic results of these two tests are given in the following table:

| Depolarizer | Weight of the depolarizer mass | Dimensions of the mass | Electromotive force |
|---|---|---|---|
| | Grams | Millimeters | |
| $MnO_2$ treated according to the invention | 9.5 | 15 x 18 | 4.90 |
| $MnO_2$ not treated | 13.2 | 15 x 18 | 4.56 |

Discharge remaining the same through 15 ohm at 20° C.

The chemical power of reaction of the product treated according to the invention may be shown by its behaviour towards oxalic acid. While non-treated natural pyrolusite is hardly acted upon by oxalic acid and only after its temperature has been increased, the product treated according to the present invention is vigorously reduced at once even at a normal temperature.

The apparent specific gravity of the treated product compared to that of the non-treated product is in the ratio of 0.6 to 1. Also the pH value of the treated product is higher than in the non-treated product.

I claim:

A method of manufacturing a depolarizer of high depolarizing capacity by roasting natural pyrolusite in presence of carbon and subsequent treatment with a mineral acid consisting in that the still hot reduced mass which consists of a mixture of lower oxides below the formula $Mn_2O_3$ is suddenly quenched in water before its treatment with acid.

CARLO ROSSETTI.